(12) United States Patent
Nishimura et al.

(10) Patent No.: US 10,242,522 B2
(45) Date of Patent: Mar. 26, 2019

(54) ELECTRONIC LOCKER

(71) Applicant: Panasonic Intellectual Property Management Co., Ltd., Osaka (JP)

(72) Inventors: Daisuke Nishimura, Osaka (JP); Kimiaki Toshikiyo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 85 days.

(21) Appl. No.: 15/322,139

(22) PCT Filed: Jul. 27, 2015

(86) PCT No.: PCT/JP2015/003747
§ 371 (c)(1),
(2) Date: Dec. 26, 2016

(87) PCT Pub. No.: WO2016/021145
PCT Pub. Date: Feb. 11, 2016

(65) Prior Publication Data
US 2017/0161984 A1    Jun. 8, 2017

Related U.S. Application Data

(60) Provisional application No. 62/032,968, filed on Aug. 4, 2014.

(51) Int. Cl.
*G07F 17/12*      (2006.01)
*E05B 73/00*      (2006.01)
*G06Q 10/08*      (2012.01)
*G07F 7/00*       (2006.01)

(52) U.S. Cl.
CPC .............. *G07F 17/12* (2013.01); *E05B 73/00* (2013.01); *G06Q 10/0836* (2013.01); *G07F 7/005* (2013.01)

(58) Field of Classification Search
USPC ........................................................... 702/155
See application file for complete search history.

(56) References Cited

U.S. PATENT DOCUMENTS

| | | |
|---|---|---|
| 4,836,352 A | 6/1989 | Tateno et al. |
| 2008/0035390 A1 | 2/2008 | Wurz |
| 2008/0164074 A1 | 7/2008 | Wurz |
| 2014/0098223 A1 | 4/2014 | Murata et al. |

(Continued)

FOREIGN PATENT DOCUMENTS

| | | |
|---|---|---|
| JP | 63-257866 | 10/1988 |
| JP | 3-221011 | 9/1991 |

(Continued)

OTHER PUBLICATIONS

International Search Report of PCT application No. PCT/JP2015/003747 dated Sep. 29, 2015.

*Primary Examiner* — Paul D Lee
(74) *Attorney, Agent, or Firm* — McDermott Will & Emery LLP

(57) ABSTRACT

An electronic locker includes a plurality of cabinets, a measurement unit capable of measuring a dimension of an object, and a controller. The controller compares the dimension of the object measured by the measurement unit with a table of dimensions of the plurality of cabinets stored previously to select a cabinet suitable for the dimension of the object out of the plurality of cabinets.

14 Claims, 2 Drawing Sheets

(56) References Cited

U.S. PATENT DOCUMENTS

| | | | | |
|---|---|---|---|---|
| 2016/0025549 A1* | 1/2016 | Motoyama | ........... | G01G 19/414 177/1 |
| 2016/0027261 A1* | 1/2016 | Motoyama | ............. | G06Q 10/04 340/313 |

FOREIGN PATENT DOCUMENTS

| | | |
|---|---|---|
| JP | 2007-219742 | 8/2007 |
| JP | 2008-151764 | 7/2008 |
| JP | 2012-168800 | 9/2012 |
| JP | 2012-198700 | 10/2012 |
| JP | 2014-077668 | 5/2014 |

* cited by examiner

ELECTRONIC LOCKER

CROSS-REFERENCE TO RELATED APPLICATIONS

This application is a U.S. national stage application of the PCT International Application No. PCT/JP2015/003747 filed on Jul. 27, 2015, which claims the benefit of foreign priority of U.S. patent application 62/032,968 filed on Aug. 4, 2014, the contents all of which are incorporated herein by reference.

TECHNICAL FIELD

The present invention relates to an electronic locker.

BACKGROUND ART

Sales of a commodity product by so-called e-commerce in which a user orders a commodity product on the Internet and a dealer receiving the order delivers the commodity product to the house of the user have been increasing in recent years. In the sales of a commodity product utilizing the e-commerce, there has been prevailed service that a dealer delivers a commodity product to a commodity product storage place designated by a user, and the commodity product is temporarily stored at the commodity product storage place, before the user receives it. An electronic locker, for example, is utilized as the commodity product storage place in the above-described service.

An electronic locker is installed at a storefront or the like of a retail store. First, a user designates, concurrently with ordering the commodity product, an electronic locker installed at a place that is accessible by the user such as an electronic locker nearest the user or an electronic locker on the way of his or her commute.

A dealer who receives an order delivers a commodity product to the electronic locker designated by the user, and then, contains and stores the commodity product inside of a cabinet in the electronic locker.

Thereafter, the user unlocks a container unit of the electronic locker by a releasing method using a personal identification number or the like, and then, takes out the commodity product stored inside of the electronic locker. In this manner, the commodity product is finally delivered to the user.

With this system, delivery during absence can be avoided, thereby reducing unnecessary delivery by a dealer. Incidentally, the technique relating to the electronic locker is disclosed in, for example, PTL 1.

CITATION LIST

Patent Literature

PTL 1: Unexamined Japanese Patent Publication No. S63-257866

SUMMARY OF THE INVENTION

The present invention provides an electronic locker that appropriately selects a cabinet suitable for the size of a commodity product.

An electronic locker according to the present invention includes: a plurality of cabinets; a measurement unit capable of measuring a dimension of an object; and a controller. The controller compares the dimension of the object measured by the measurement unit with a table of dimensions of the plurality of cabinets stored previously to select a cabinet suitable for the dimension of the object out of the plurality of cabinets.

With this configuration, a dealer can instantaneously recognize a cabinet having a size suitable for a commodity product when using an electronic locker. As a consequence, each of commodity products can be contained in a cabinet having a proper size, thus achieving efficient use of an electronic locker.

DESCRIPTION OF EMBODIMENTS

Prior to the description of exemplary embodiments of the present invention, problems in a conventional electronic locker will be briefly described below. When a dealer contains a commodity product in a cabinet of an electronic locker, he or she needs to further select a cabinet according to the size of the commodity product out of un-occupied cabinets. However, it is difficult to instantaneously determine a cabinet according to the size of the commodity product. Therefore, the dealer sometimes contains the commodity product in a cabinet having the next larger size or more than that required. Consequently, when the dealer needs to contain, in a cabinet, a large commodity product that can be stored only in a large cabinet, all of the large cabinets have already occupied.

An electronic locker in exemplary embodiments of the present invention will be described with reference to the drawings. Here, an "electronic locker" in the following description designates the entire configuration including a plurality of containers; and a "cabinet" denotes one of the plurality of containers disposed in the electronic locker.

First Exemplary Embodiment

Figure 1:
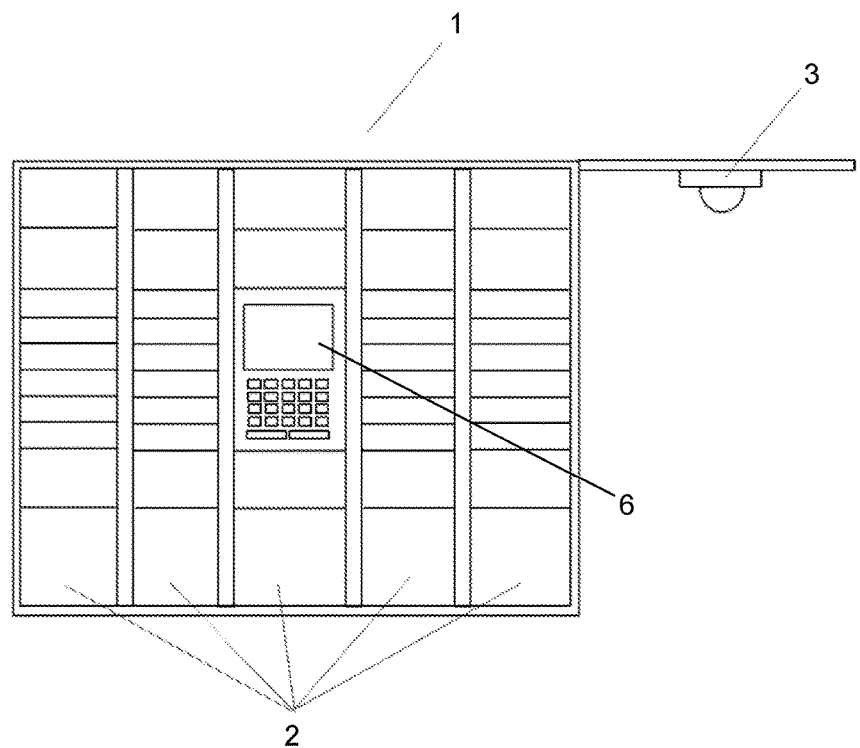
FIG. 1 is a general view schematically showing an electronic locker in a first exemplary embodiment of the present invention.
Figure 2:
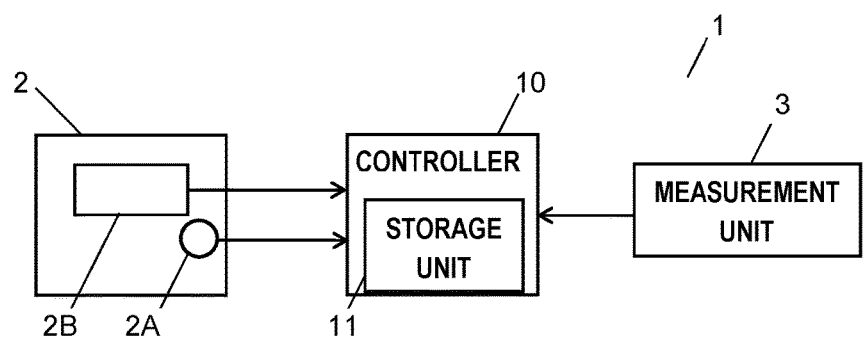
FIG. 2 is a block diagram of the electronic locker shown in FIG. 1.

FIG. 1 is a general view schematically showing electronic locker 1 in a first exemplary embodiment. FIG. 2 is a block diagram of electronic locker 1. Electronic locker 1 has a plurality of cabinets 2.

Cabinet 2 has a mechanism in which once cabinet 2 is locked, it cannot be opened unless an unlocking operation with a personal identification number or the like is recognized. A key is independently assigned to each of cabinets 2.

Moreover, electronic locker 1 includes measurement unit 3 capable of measuring the dimension of an object to be stored (hereinafter simply referred to as an object). Specifically, a ToF (Time of Flight) sensing camera is used as measurement unit 3. The ToF sensing camera includes a light source for irradiating an object with a plurality of near-infrared light beams and a light receiving element.

The ToF sensing camera is adapted to measure a timing at which an object is irradiated with near-infrared light beams and a timing at which the light receiving element receives a light beam reflected on the object, and then, to calculate a distance between the light receiving element and the object based on a time difference between the timings. The ToF sensing camera can measure the time difference per pixel so as to acquire a distance image. In addition, the ToF sensing camera can acquire a normal two-dimensional pickup image at the same time as the acquisition of the distance image, so as to estimate the three-dimensional shape and dimension of the object. In this manner, measurement unit 3 is designed to calculate the dimension of the object based on the light reception result of the light beam reflected on the object with the irradiation of the object with the light beam.

Here, as shown in FIG. 1, measurement unit 3 is disposed in such a manner as to pick up an image of the object from upward to downward in electronic locker 1.

Moreover, as illustrated in FIG. 2, electronic locker 1 includes controller 10. Controller 10 is adapted to select cabinet 2 having a size suitable for the dimension of the object, measured by measurement unit 3.

Hereinafter, description will be given on the using method and operation of electronic locker 1 by way of an example. Here, a situation is assumed where a deliverer comes to deliver a commodity product to electronic locker 1.

At this time, a deliverer places a commodity product as an object to be stored at a predetermined position. The predetermined position signifies a place where the size of the commodity product can be measured by measurement unit 3, and it is under measurement unit 3.

Measurement unit 3 measures the dimension of the placed commodity product in height, vertical, and lateral directions, and outputs the resultant data to controller 10.

Controller 10 compares data on the dimension of the commodity product measured by measurement unit 3 with a table of dimensions of cabinets 2 previously stored, and then, selects cabinet 2 having a size most suitable for the size of the commodity product out of the plurality of cabinets 2. Here, controller 10 has the function of grasping the use situation of each of cabinets 2 all the time, and therefore, controller 10 selects the best one out of un-occupied cabinets 2. In order to achieve the function, for example, controller 10 includes storage unit 11, and furthermore, is connected to electronic key 2A assigned to cabinet 2. Storage unit 11 stores the table of the dimensions of each of cabinets 2. Controller 10 can recognize the locked/unlocked state of electronic key 2A so as to grasp the use situation of each of cabinets 2 all the time.

Additionally, controller 10 notifies a dealer of selected cabinet 2. Therefore, as illustrated in, for example, FIG. 2, display unit 2B is provided on a door of each of cabinets 2, for indicating usable cabinet 2. Alternatively, as shown in FIG. 1, usable cabinets may be displayed on display panel 6 disposed for entire electronic locker 1 together with the number or positions of cabinets 2.

And then, the deliverer contains the commodity product in notified cabinet 2. In this manner, a series of operations comes to an end.

Specifically, cabinet 2 most suitable for containing the commodity product according its size is selected in the above-described manner in electronic locker 1. Thus, the deliverer can instantaneously recognize cabinet 2 having a size suitable for the delivered commodity product.

Incidentally, although measurement unit 3 measures the dimension of the commodity product in the height, vertical, and lateral directions in electronic locker 1, measurement unit 3 may measure, for example, the dimension of a commodity product in a height direction and read a logo mark at the upper surface of the commodity product. The size of a box for packaging a commodity product is limited to several patterns according to dealers. Consequently, measurement unit 3 can read a logo mark, so as to identify a dealer. Measurement unit 3 can estimate the use of a box of what pattern by what dealer based on the identification result and the measurement result of the dimension in the height direction. As a consequence, measurement unit 3 can estimate the size of a commodity product even if measurement unit 3 does not measure the dimensions of two remaining sides (in vertical and lateral directions). Measurement unit 3 may output data on the dimension in height, vertical, and lateral directions of a commodity product obtained as described above to controller 10.

Second Exemplary Embodiment

Figure 3:
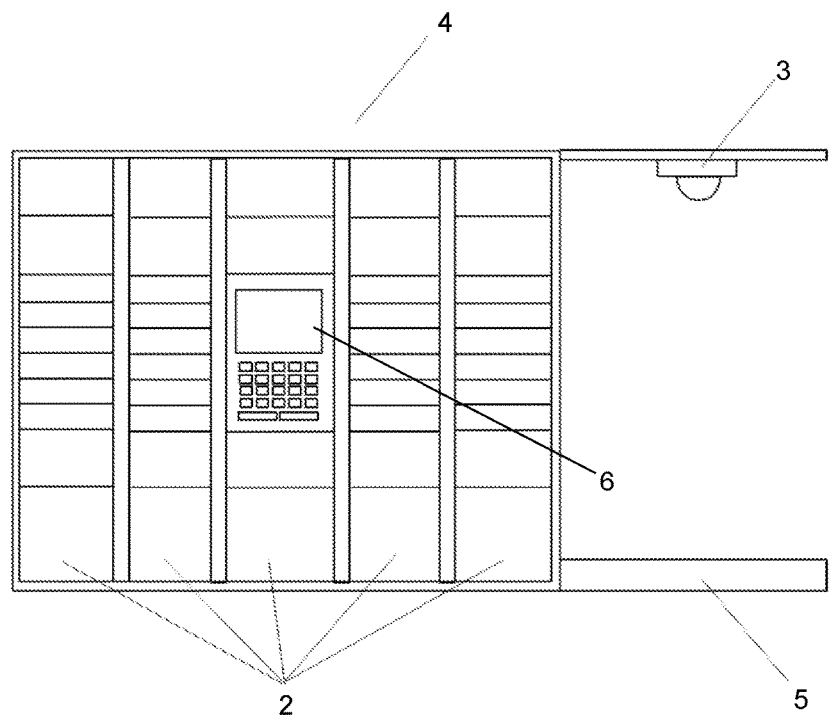
FIG. 3 is a general view schematically showing an electronic locker in a second exemplary embodiment of the present invention.
Figure 4:
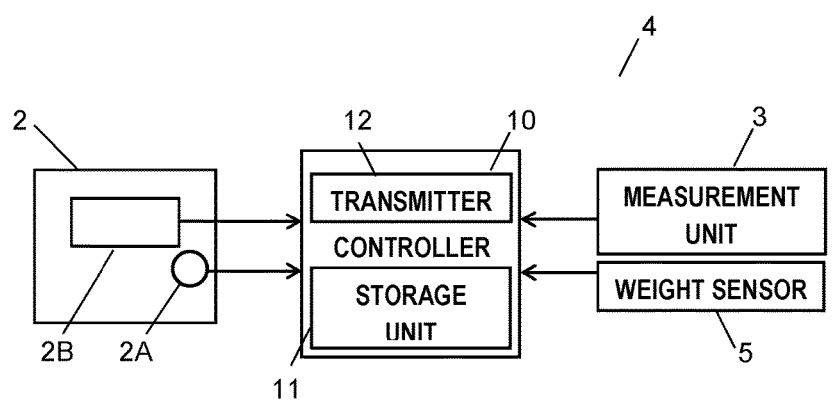
FIG. 4 is a block diagram of the electronic locker shown in FIG. 3.

FIG. 3 is a general view schematically showing electronic locker 4 in a second exemplary embodiment. FIG. 4 is a block diagram of electronic locker 4. Electronic locker 4 includes weight sensor 5 in addition to the constituent elements of electronic locker 1 in the first exemplary embodiment. Moreover, controller 10 includes transmitter 12. The other configuration is basically identical to that of electronic locker 1. Therefore, the same constituent elements in FIG. 3 and FIG. 4 are designated by the same reference numerals as those in electronic locker 1, and therefore, their description will be omitted below.

As shown in FIG. 3, weight sensor 5 is disposed under measurement unit 3. Weight sensor 5 can measure the weight of an object placed thereon.

The using method and operation of electronic locker 4 will be described by way of an example.

For example, electronic locker 4 can be utilized suitably for delivering a package from a user to a deliverer when the user sends the package.

When a user places a package at a predetermined position, measurement unit 3 measures the size of the package, and furthermore, weight sensor 5 measures the weight of the package. Moreover, measurement unit 3 detects destination information such as a package destination or a zip code as well. Specifically, it is preferable that measurement unit 3 should irradiate a package as an object with a light beam, so as to detect the package destination information based on the light reception result of a light beam reflected on the package.

These size measurement result, weight measurement result, and destination information are output to controller 10. Controller 10 compares these results with a charge table previously stored in storage unit 11, and thus, calculates a charge required to send the package. After that, controller 10 notifies a user of the calculated charge. The charge is displayed on, for example, display panel 6 provided for entire electronic locker 4.

After the user pays the charge, controller 10 further selects cabinet 2 having a suitable size based on the measurement result of the dimension of the package, like electronic locker 1 in the first exemplary embodiment, and then, notifies the user of selected cabinet 2.

And then, the user contains the package in notified and designated cabinet 2. Thereafter, the deliverer unlocks cabinet 2 containing the package and receives the package. In this manner, the user can send the package to the deliverer.

Additionally, it is preferable that various kinds of data such as the above-described size measurement result and weight measurement result and destination information should be transmitted to the deliverer in advance. Specifically, controller 10 should preferably transmit at least any of the dimension and weight of and the destination information on the object measured by measurement unit 3 to the outside. For this purpose, controller 10 should preferably include transmitter 12. The deliverer receives these various kinds of data, so that the deliverer can check an optimum route in delivering the package in advance. Moreover, the deliverer can check a loading method in loading the package on a transportation unit such as a truck. Therefore, the deliverer can increase a package load rate or enhance an unloading efficiency.

As described above, in addition to the function of electronic locker 1 in the first exemplary embodiment, electronic locker 4 can be suitably utilized in sending the package from the user to the deliverer.

Here, although storage unit 11 and transmitter 12 are included in controller 10 in the above description, storage unit 11 and transmitter 12 may be disposed independently of controller 10 and may be connected to controller 10.

INDUSTRIAL APPLICABILITY

With the electronic locker according to the present invention, the dealer or the user can instantaneously recognize the cabinet having a size suitable for the commodity product. As a consequence, each of the commodity products can be contained in the cabinet having the suitable size, and thus, the electronic locker can be efficiently utilized.

REFERENCE MARKS IN THE DRAWINGS 1, 4 electronic locker
2 cabinet
2A electronic key
2B display unit
3 measurement unit
5 weight sensor
6 display panel
10 controller
11 storage unit
12 transmitter

The invention claimed is:

1. An electronic locker comprising:
a plurality of cabinets;
a weight sensor configured to measure a weight of an object, the weight sensor being provided adjacent to the plurality of cabinets;
a measurement unit configured to measure a dimension of the object, the measurement unit being provided above the weight sensor; and
a controller including a memory, wherein:
the controller is configured to:
compare the dimension of the object measured by the measurement unit with a table of dimensions of the plurality of cabinets stored in the memory to select a cabinet suitable for the dimension of the object out of the plurality of cabinets, and
calculate a charge required to send the object by comparing the dimension of the object measured by the measurement unit and the weight of the object measured by the weight sensor with a charge table stored in the memory unit.

2. The electronic locker according to claim 1, wherein the controller selects a cabinet suitable for the dimension of the object out of un-occupied cabinets of the plurality of cabinets.

3. The electronic locker according to claim 1, wherein the measurement unit irradiates the object with a light beam, and thus, calculates the dimension of the object based on a light reception result of a light beam reflected on the object.

4. The electronic locker according to claim 1, wherein the controller transmits the dimension of the object measured by the measurement unit to outside.

5. The electronic locker according to claim 1, wherein the controller transmits the weight of the object measured by the weight sensor to outside.

6. The electronic locker according to claim 1, wherein the measurement unit irradiates the object with a light beam, and thus, detects destination information on the object based on a light reception result of a light beam reflected on the object.

7. The electronic locker according to claim 6, wherein the controller transmits the destination information on the object detected by the measurement unit to outside.

8. The electronic locker according to claim 6, wherein the controller further compares the destination information on the object with the charge table stored in the memory, and calculates the charge required to send the object.

9. The electronic locker according to claim 8, further comprising a display panel displaying information transmitted from the controller.

10. The electronic locker according to claim 9, wherein the display panel displays the charge.

11. The electronic locker according to claim 10, wherein after the charge is paid, the cabinet selected by the controller is locked.

12. The electronic locker according to claim 1, further comprising a display panel displaying information transmitted from the controller.

13. The electronic locker according to claim 12, wherein the display panel displays the charge.

14. The electronic locker according to claim 13, wherein after the charge is paid, the cabinet selected by the controller is locked.

* * * * *